Feb. 3, 1931.  D. G. BRANDT  1,791,113
METHOD AND APPARATUS FOR PRODUCING GASOLINE
Filed Feb. 25, 1926
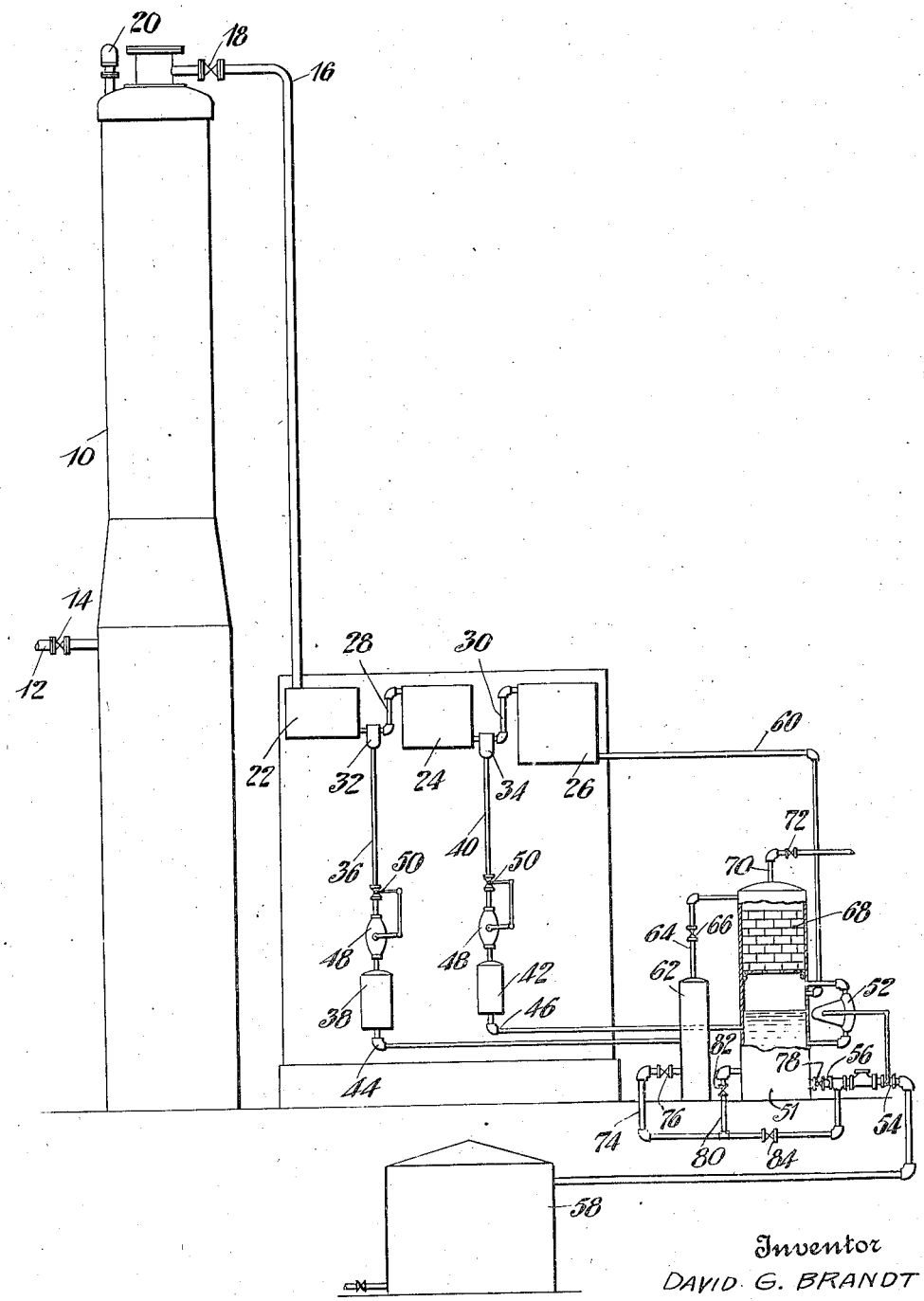
Inventor
DAVID G. BRANDT
By his Attorney
Edmund G. Borden Patented Feb. 3, 1931

1,791,113

UNITED STATES PATENT OFFICE

DAVID G. BRANDT, OF WESTFIELD, NEW JERSEY, ASSIGNOR TO DOHERTY RESEARCH COMPANY, OF NEW YORK, N. Y., A CORPORATION OF DELAWARE

METHOD AND APPARATUS FOR PRODUCING GASOLINE

Application filed February 25, 1926. Serial No. 90,498.

This invention relates to an improved process for treating vapors from the distillation and cracking of petroleum oil to produce gasoline and also to apparatus for practicing the process.

It is an object of the invention to provide a process for the treatment of petroleum vapors derived from the distillation and cracking of petroleum oil which will permit a stabilized or finished gasoline to be produced without the necessity of preliminary weathering of the product and which will permit the recovery from the tail gases of all the gasoline constituents therein without the necessity of separate treatment apart from the regular operation of the process.

In accordance with the present invention, the petroleum vapors are passed through a series of condensing stages, preferably three, the last of which is maintained at what may be termed normal temperature, that is to say, at such temperature as the temperatures of the cooling medium and the weather will permit, which normal temperature may be in the neighborhood of 50° F.

The condensates obtained at the respective condensing stages preceding the last are recondensing stages preceding the last are removed from the residual vapors and gases passing to the next adjacent condensing stage and are individually cooled to normal temperature out of contact with such vapors and gases, said condensates, including that obtained from the last condensing stage, being blended in a manner more fully appearing hereinafter.

The temperature maintained at the first condensing stage may vary within quite wide limits depending on the nature of the condensate desired to be obtained. I have, however, found that a temperature of approximately 250° F. produces a condensate best suited to the requirements of the process. At this temperature the greater portion of the condensible vapors are condensed.

The temperature maintained at the intermediate condensing stage, assuming that three condensing stages are employed, is preferably approximately 150° F. At this temperature the major portion of the condensible vapors remaining uncondensed after passing through the first condensing stage will condense.

The temperature maintained at the last condensing stage has already been indicated as being a normal temperature. At this this temperature the residual vapors will condense though there will of course be tail gas accompanying the condensate.

At the temperature and pressure prevailing at the various condensing stages the condensates are of course saturated with dissolved gases and if exposed to the weather at those particular temperatures there would be a very considerable evolution of gas therefrom as well as of lighter gasoline constituents which would be carried along by the evolving gases. However, by cooling those condensates which are produced at temperatures above normal such condensates will be rendered stable as that term is usually understood in the art. In accordance with the present process the condensates obtained at those condensing stages which are maintained above normal temperature, that is to say, the condensates obtained at the condensing stages preceding the last, are individually cooled to normal temperature out of contact with the uncondensed vapors and accompanying gases. These condensates when cooled to normal temperature will have the capacity of holding in solution relatively lower boiling point condensates along with the gases dissolved therein, the condensate thrown down at the higher temperature having the greater absorbing capacity. In accordance with the present invention the various condensates are mixed at normal temperature, the resultant product being a finished gasoline.

At the temperature prevailing at the last condensing stage in the series, the tail gas will be saturated with gasoline constituents at atmospheric pressure. In order to recover these constituents, scrubbing of the tail gas must be effected. According to the present invention such scrubbing is done with cooled high-temperature-condensing-stage condensate, inasmuch as this condensate has the greatest absorption capacity for light ends.

While the process may be carried on under atmospheric pressure it is preferred to carry on the process under a pressure sufficient to produce relatively dry tail gas at the temperature prevailing at the last condensing stage, that is to say, at normal temperature. While the pressure may vary within fairly wide limits, the upper practical limit being approximately seven (7) atmospheres, it is preferred to operate under a pressure somewhat less than four (4) atmospheres, preferably a pressure of approximately fifty pounds per square inch, this pressure serving to produce a relatively dry tail gas which does not need to be scrubbed, thus simplifying the process to this extent.

In mixing the condensates it is preferred to provide a tank in which a body of condensate may be collected. The last-condensing-stage condensate and its accompanying tail gas are introduced into the tank above the liquid level therein, the condensate immediately mixing with the condensate in the tank and the tail gas escaping through a valve in the tank set to maintain the desired pressure therein if the process is being carried on under pressure. If, however, the process is being carried on under atmospheric pressure the gas is scrubbed as previously stated before it passes from the tank. The condensate obtained from the intermediate condensing stage preferably enters the tank below the liquid level therein to prevent as far as possible any disturbance to the liquid within the tank. The condensate obtained from the first condensing stage is conveniently received in a separate tank in order to permit it to be used for scrubbing the tail gas when the process is carried on under atmospheric pressure. In the event that no scrubbing of the tail gas is necessary, due to the process being carried on under pressure, the condensate may be introduced directly into the main tank for mixing with the other condensates.

Further details of the process will be best understood by reference to the apparatus employed in the practice of the same and such apparatus will now be described.

The single figure of the drawings is a diagrammatic view of the preferred form of apparatus, the view showing a fractionating tower from which the vapors to be treated pass to the condensing stages or condensers of which three are shown, the tank in which the condensates are received being shown as adapted for scrubbing the tail gases, the tank being shown in partial section for a better understanding of the invention.

Referring to the drawing, 10 indicates a fractionating tower of any approved form into which vapors are received from a still (not shown) as by way of a pipe 12 having a valve 14 therein. The vapors reaching the top of the tower pass therefrom through a pipe 16 having a valve 18 therein at its receiving end. The tower is shown as having a safety valve 20 at the top thereof.

Pipe 16 leads to a condsenser 22 which is in series with two other condensers 24 and 26. Three condensers will be sufficient for all practical purpose though if desired additional condensers may be used. These condensers may be of any approved form but are preferably of the water-cooled surface condenser type. Suitable pipes 28 and 30 connect the adjacent condensers 22—24 and 24—26, respectively. The condensate and uncondensed vapors and gases leaving the first condenser pass through a separator 32 wherein the condensate is separated from said vapors and gases and a similar separator 34 is provided between condensers 24—26 for separating the second stage condensate from the uncondensed vapors and gases.

A pipe 36 connects the separator 32 with a cooler 38 and a pipe 40 connects the separator 34 with a similar cooler 42. These coolers may be of any approved form but are preferably of the water cooled type. In order to prevent vapors and gases from flowing to the coolers, suitable means may be provided in conjunction with each cooler for controlling the flow of fluid thereto. Such means may be of any preferred form but for the purpose of illustration there has been shown a liquid actuated device 48 between the respective separators and coolers, which device will operate to close a valve 50 in the line leading to the cooler from the separator when a predetermined liquid level has been reached in the container forming a part of the device 48.

A condensate receiving and mixing tank is shown at 51. This tank is provided with any suitable means for maintaining a predetermined liquid level therein one type of such means being generally indicated at 52 and operable to control a valve 54 in an outlet pipe 56 leading from the tank to a storage tank 58.

Condensate from the last condenser 26 of the series enters the receiving tank above the liquid level therein by way of a pipe 60. Cooled condensate from cooler 42 enters the tank below the liquid level therein through a pipe 46. Condensate from cooler 38 is introduced into the tank in the following manner. Pipe 44 connects with an auxiliary tank 62 between the top of which and the top of the tank 51 is a pipe 64 having a valve 66 therein. When it is desired to scrub the tail gases entering the tank 51 along with the condensate flowing from condenser 26, the valve 66 is opened whereupon condensate will flow downward over the plates 68 and scrub the upwardly flowing tail gas. The tail gas leaves the tank through pipe 70 having a valve 72 therein. When the process is carried on under atmospheric pressure this valve will permit free escape of the tail gas whereas when the process is carried on under pressure the valve will be so adjusted as to maintain the desired pressure within the tank in which event also the valve 66 will be closed. When the process is practiced under pressure the condensate entering tank 62 may flow therefrom through a pipe 74 and mingle with the liquids flowing from tank 51 at a point therebeyond but ahead of the valve 54 in the outlet pipe. A valve 76 is provided in the pipe 74 near the auxiliary tank 62 to permit the outflow to be controlled. A similar valve 78 is preferably provided at the receiving end of pipe 56 leading from tank 51. If desired a branch pipe 80 may be provided between the pipe 74 and tank 51 for allowing liquid from the auxiliary tank to be introduced directly thereinto, suitable valves 82, 84 being provided to control the flow of the liquid.

It will be noted that the apparatus is so constructed that the condensate which enters the cooler 38 from the first condenser 22 of the series may be utilized for scrubbing the tail gas when the process is carried out under atmospheric pressure and may enter the main receiving tank 51 direct or may by-pass said tank and mix with the outgoing stream of condensate beyond the tank. The valve arrangement also permits the condensate in tank 62 to be diverted into three separate streams, one stream flowing to the top of the receiving tank, another entering the receiving tank direct and the third entering the outgoing stream of condensate from the main tank. This arrangement provides for great flexibility of control under various operating conditions.

It may also be pointed out that the present invention permits the cooling operation to be carried out with a minimum amount of water, this being an important consideration in regions where water is scarce. A brief description as to how the water may be circulated may be helpful.

It will be remembered that the last condensing stage 26 is maintained at a normal temperature. The cooling water may first be passed through the last condensing stage 26 and from thence to the intermediate condensing stage 24 and finally to the first condensing stage 22 from whence the water may be cooled in any suitable manner as by being allowed to trickle down a cooling tower after which the water will be recirculated. The cooling water passing through the high temperature condensing stage 22 may reach the boiling point of water and yet effectually serve as a cooling medium on account of the relatively high temperature differential between the water and the gases to be cooled or condensed.

While the invention has been described with considerable particularity of detail it is to be understood that no limitations are intended except as may be defined by the appended claims.

What is claimed is:

1. The method of producing stable gasoline from cracked gasoline vapors being conducted from a cracking unit, which comprises passing the vapors through a series of three condensing zones in which they are maintained under a pressure of approximately fifty pounds per square inch, maintaining a temperature of approximately 250° F. in the first condensing zone and a temperature of approximately 150° F. in the second condensing zone whereby condensation of only the relatively high boiling point constituents of the vapors are condensed in the first two zones and condensation of the relatively low boiling point constituents and gases is substantially prevented, maintaining the temperature in the last condensing zone at approximately normal atmospheric temperature to thereby condense under said pressure substantially all of the remaining gasoline constituents in said vapors, cooling the condensate produced in the first two condensing zones while maintaining the same out of contact with the remaining vapors and gases, and mixing the cooled condensate with the condensate from the last condensing zone of the series while maintaining said pressure.

2. The method of producing stable gasoline from cracked gasoline vapors being conducted from a cracking unit, which comprises passing the vapors through a series of condensing zones maintained at progressively lower temperatures, the last of said zones being maintained at substantially normally atmospheric temperature, maintaining a superatmospheric pressure on the vapors in said zones not exceeding seven atmospheres, cooling the condensate produced in the first condensing zones to substantially normal atmospheric temperature while maintaining the same out of contact with the remaining vapors, passing to the last condensing zone, and mixing the cooled condensate with the condensate produced in the last condensing zone of the series.

3. The method of condensing the gasoline fraction of vapors from a distilling system, which comprises subjecting the vapors while under superatmospheric pressure to gradually lower temperature conditions in a series of condensing zones in the last of which the remaining uncondensed vapors are cooled to substantially normal atmospheric temperature to thereby condense the lower boiling point gasoline constituents of the vapors, maintaining a sufficiently high temperature in the preceding zones to prevent substantial condensation of said relatively low boiling point constituents, cooling the condensate produced in the first zone of the series and introducing it into the upper portion of a mixing and stabilizing tower, maintaining in the said tower a body of mixed condensate having a higher mean boiling point than that of the condensate obtained in said last condensing zone, cooling the condensate from an intermediate condensing zone and introducing it into the lower portion of said tower, passing the condensate and uncondensed vapors from said last condensing zone into the mid-portion of said tower thereby to mingle and blend all said condensates, and passing any uncondensed vapors from said zones into contact with the condensate from said first condensing zone.

4. A method of producing gasoline by the condensation of hydrocarbon vapors containing gasoline constituents, comprising passing the vapors under a superatmospheric pressure through a series of condensing zones the last of which is maintained at substantially normal atmospheric temperature while the preceding zone or zones are maintained at a temperature above normal to thereby prevent substantial condensation of the relatively low boiling point constituents in said preceding zone or zones, individually cooling to substantially normal atmospheric temperature those condensates derived from the said preceding condensing zone or zones, maintaining a body of said cooled condensate having a higher mean boiling point than that of the condensate obtained in said last condensing zone, and mixing with said body the condensate obtained in the last condensing zone, thereby to retain in liquid condition the relatively low boiling point constituents condensed in said last condensing zone when the resulting mixture is brought to normal atmospheric pressure conditions.

5. In apparatus for condensing hydrocarbon vapors, the combination of a series of condensers through which said vapors may be passed, individual conduits connected to the individual condensers for leading away the condensates formed in the respective condensers, a pair of tanks, the conduit leading from the first condenser of the series emptying into one of said tanks, the other conduits emptying into the other tank, a valved conduit between the two tanks, means for maintaining a predetermined liquid level in that tank into which the conduit leading from the last of the condensers of the series empties, and cooling means associated with each of said conduits except that leading from the last condenser to effect cooling of the condensates prior to their entrance into said tanks.

In testimony whereof I affix my signature.

DAVID G. BRANDT.